United States Patent [19]

Dinter

[11] Patent Number: 5,154,865
[45] Date of Patent: Oct. 13, 1992

[54] PROCESS FOR THE PRODUCTION OF MOLDINGS FROM THERMOTROPIC, LIQUID-CRYSTALLINE SUBSTANCES

[75] Inventor: Peter Dinter, Hallgarten, Fed. Rep. of Germany

[73] Assignee: Hoechst Aktiengesellschaft, Frankfurt am Main, Fed. Rep. of Germany

[21] Appl. No.: 692,618

[22] Filed: Apr. 29, 1991

[30] Foreign Application Priority Data

Apr. 27, 1990 [DE] Fed. Rep. of Germany ....... 4013553

[51] Int. Cl.⁵ .............................................. B29C 47/14
[52] U.S. Cl. .................... 264/108; 264/171; 264/176.1; 264/211.12; 264/331.21
[58] Field of Search ............ 264/103, 108, 171, 176.1, 264/211.12, 331.21; 425/382.3

[56] References Cited

U.S. PATENT DOCUMENTS 4,960,552 10/1990 Portugall et al. ................... 264/108
5,019,309 5/1991 Brunnhofer ......................... 264/103

FOREIGN PATENT DOCUMENTS 3603432 8/1987 Fed. Rep. of Germany .
3603995 8/1987 Fed. Rep. of Germany .

Primary Examiner—Leo B. Tentoni
Attorney, Agent, or Firm—Foley & Lardner

[57] ABSTRACT

In the production of moldings from thermotropic, liquid-crystalline plastics, the chains of the LC polymer molecules are oriented in at least two preferred directions independent of one another. For this purpose, the polymer melt stream which emerges from an extruder is divided into two part streams which are fed via melt lines to an adapter. A distributing element which is caused to rotate by a drive unit is located in the adapter. The adapter is upstream of a slot die and is connected to the latter. One part stream forms a polymer matrix while the other part stream incorporates in, or is superimposed on, this polymer matrix individual polymer strands at different cross-sectional levels by means of the rotating distributing element. These polymer strands reinforce the polymer matrix. These polymer strands form multiple-pitch helices. The two part streams combined in the adapter enter the slot die and are shaped in the latter to give a multilayer melt film which is extruded through the slot die onto a cooling roller.

29 Claims, 4 Drawing Sheets

PROCESS FOR THE PRODUCTION OF MOLDINGS FROM THERMOTROPIC, LIQUID-CRYSTALLINE SUBSTANCES

TECHNICAL FIELD

The present invention relates to a process and an apparatus for the production of moldings from thermotropic, liquid-crystalline plastics having a defined orientation of the chains of the LC polymer molecules in at least two preferred directions independent of one another, and to moldings produced by the process.

BACKGROUND OF THE INVENTION

Thermotropic, liquid-crystalline polymers are becoming increasingly important for plastics processing. These products are wholly or partly aromatic polycondensates, such as polyesters, polyesteramides, polyetheresters, polyestercarbonates, polyesteramidoimides and similar polymers. One characteristic of the thermoplastic processing of the above-mentioned polymers is that, when strain flows and shear flows act on the liquid-crystalline melt, its molecular chains can be oriented in a controlled manner. Thus, this effect includes the possibility of producing both products having isotropic mechanical properties and those having anisotropic mechanical properties, depending on the degree of orientation. The most frequently encountered case of anisotropic behavior in practice results from monoaxial deformation of the melt film while being forced out of a die, preferential orientation in the longitudinal direction of the molding, for example of a film web, being imposed on the molding. There are consequently generally outstanding strength properties in the longitudinal direction, which however are obtained at the expense of the property profile in the transverse direction. In the case of sheet-like structures, such as, for example, films or sheets, splicing is observed in the transverse direction when external mechanical forces act at right angles to the preferred orientation direction. A film or a sheet showing such behavior is only of limited use in practice.

DE-A-36 03 995 discloses a process for the production of shaped parts from thermotropic, liquid-crystalline plastics having a defined orientation of the LC polymer molecules in at least two preferred directions independent of one another, in which the thermoplastic melt stream is extruded through a die. At least temporarily while flowing through the die, the melt stream is subjected, in two or more predetermined directions, to strains for orienting the chain molecules, by means of forces determined by the shape of the bounding surfaces. The strain in the x direction is established in a predetermined direction by the set spacing of the bounding surfaces. The strain in the flow direction is fixed by predetermined functions which incorporate geometric parameters. The strain in the y direction is likewise fixed by a certain function with geometric parameters. In this known process, orientation of the molecular chains is effected inside a die, for example a slot die, by virtue of the fact that surfaces bounding the melt stream are appropriately shaped inside the die.

German Offenlegungsschrift DE-A-36 03 432 discloses an extruder head for the production of semifinished products from thermoplastics, having a flow channel, the flow channel being capable of being divided into at least two individual channels in a section by means of a displacement element arranged in the axial direction, and the individual channels being combined again immediately before the mouth of the flow channel. The displacement element has a plurality of guide means oriented essentially parallel to one another or radially in the direction of a common point of intersection and at an angle of, for example, 45° to the direction of flow in the flow channel. The end sections of the displacement element taper toward one another. The guide means bounding one individual channel are oriented opposite the guide means bounding the other individual channel. In this extruder head, two films are produced from the plastified material emerging from the extruder and are subsequently combined. The melt stream introduced from the extruder into the extruder head is divided by the displacement element into at least two part streams which flow through separate channels. Because of the particular design and arrangement of the guide means on the displacement element, the part streams are deflected from the original direction, one part stream preferably being deflected in the opposite direction with respect to the other part stream.

SUMMARY OF THE INVENTION

Accordingly, it is an object of the present invention to improve a process for the production of moldings from thermotropic, liquid-crystalline plastics by means of extrusion in such a way that the preferred directions of the chain molecules of the polymers are oriented in any uniaxial, biaxial or multiaxial direction.

Another object of the present invention is to improve such a process such that the mechanical and other physical properties of the finished product are substantially isotropic.

A further object of the present invention is to provide an apparatus for the production of moldings from thermotropic, liquid-crystalline plastics having a defined orientation of the chains of the LC polymer molecules in at least two preferred directions independent of one another.

In accomplishing the foregoing objectives, there has been provided, in accordance with one aspect of the present invention, a process for the production of moldings from thermotropic, liquid-crystalline plastics in the form of a polymer melt stream. The chains of LC polymer molecules in the polymer melt stream have defined orientations in at least two preferred directions. The process includes the steps of dividing the polymer melt stream into at least first and second part streams; flowing the first and second part streams through an adapter subjecting the first and second part streams to forces such that the LC polymer chains of the first part stream are oriented in a first preferred direction and the LC polymer chains of the second part stream are oriented in at least a second preferred direction different from the first preferred direction; combining the first and second part streams to form a multi-layer melt stream; and, passing the multi-layer melt stream through a die to form the molding.

In accordance with another aspect of the present invention there is provided an apparatus comprising at least one extruder providing a polymer melt extrudate, at least first and second melt lines connected to the extruder to receive the polymer melt, the first melt line receiving a first part stream of the polymer melt and the second melt line receiving a second part stream of the polymer melt. The apparatus also includes an adapter downstream of the extruder and connected to the extruder by the first and second melt lines to receive the first and second part streams. A slot die is operatively connected to the adapter. A cooling roller is positioned to receive from the slot die the molding in the form of a thin flexible sheet. The adapter preferably includes means for imposing preferred directions on the molecules of the first and second part streams such that orientation of the chain molecules is controlled and moldings made from films prepared in the apparatus of the invention have improved performance characteristics.

In accordance with still another aspect of the present invention there is provided an adapter comprising an upper end plate, a central plate, and a lower end plate operatively connected to one another to form a block having a tapering melt chamber located therein. A first inlet is provided in the upper end plate for receipt of said first part stream of the polymer melt, and a second inlet is provided in the central block for receipt of the second part stream of the polymer melt. An outlet channel is provided in the lower end plate communicating with the melt chamber. The outlet channel continues in a connecting flange which is operatively connected to the slot die.

In accordance with yet another aspect of the present invention there is provided a distributing element for dividing one of the part streams of the polymer melt into a number of polymer strands.

In general, the advantages of the present invention are obtained by dividing the polymer melt stream into two part streams, both of which are fed to an adapter, in which one part stream, as the polymer matrix, forms the base of the molding and the other part stream is divided into a large number of polymer strands in the form of helices by means of the rotating distributing element, these polymer strands being incorporated in, or superimposed on, the polymer matrix of the first part stream, these polymer strands form a multilayer reinforcing stratum for the polymer matrix during shaping of the melt stream in the slot die, the polymer strands in this multilayer reinforcing stratum being oriented in preferred directions which essentially differ from the preferred direction of the polymer matrix. This gives an isotropic property profile of the molding or of the flat film.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Numerous changes and modifications within the scope of the present invention may be made without departing from the spirit thereof, and the invention includes all such modifications.

BRIEF DESCRIPTION OF THE DRAWINGS

The details of the process and of the apparatus are described with reference to the drawings, in which.

DETAILED DESCRIPTION OF THE PREFERRED EMBODIMENTS

An apparatus for the production of moldings from thermotropic, liquid-crystalline substances having a defined orientation of the chains of the LC polymer molecules in at least two directions independent of one another has at least one extruder, melt lines, a slot die and a cooling roller onto which the molding is extruded in the form of a flat film or of a thin flexible sheet. In the apparatus, a melt line connects the extruder to an adapter, a further melt line is connected to the adapter and two part streams of polymer melts can be fed via the two melt lines to the adapter, which is upstream of the slot die, preferred directions independent of one another being imposed on said part streams in the adapter and said part streams being superimposed one on top of the other in the adapter.

In a preferred embodiment of the invention, the total polymer melt stream from the extruder can be fed to the adapter via the two melt lines in two part streams; the further melt line branches, as a bypass, from the other melt line upstream of the adapter and is connected to the adapter at a different point with respect to the other melt line, and one part stream flows via the bypass melt line and the other part stream via the other melt line into the adapter.

In another embodiment of the apparatus, the further melt line is connected to a further extruder and the part streams flowing from the extruders via the melt lines to the adapter consist of different polymer melts which have the same consistency or different consistencies.

Figure 1:
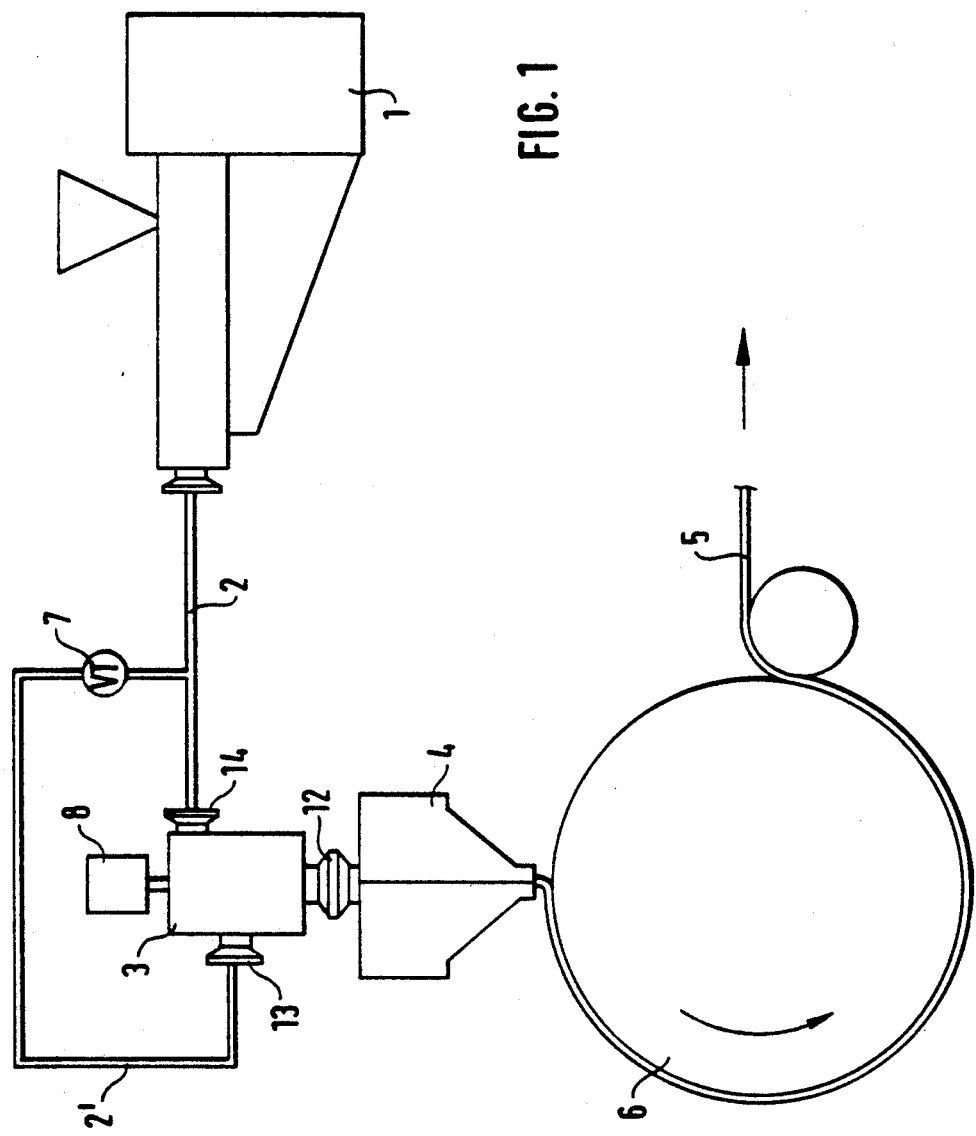
FIG. 1 schematically shows an apparatus comprising an extruder, adapter, slot die and cooling roller for the production of moldings.

The apparatus, shown in FIG. 1 for the production of multiaxially oriented films or sheets from thermotropic, liquid-crystalline polymers contains, inter alia, an extruder which is connected to an adapter 3 by melt lines 2 and 2′. A flow control valve 7 is installed in one melt line 2′ in order to regulate the melt part streams fed to the adapter 3. To influence the polymer melt fed in, the adapter 3 is equipped with a speed-controlled drive unit 8 and flanged directly to a conventional slot die 4. The melt film 5 emerging from the slot die is cooled below its melting point on a cooling roller 6. The solidified melt film 5 can be either wound as a finished film or fed to subsequent treatment stages.

Using the apparatus shown schematically in FIG. 1, the polymer melt stream is divided into two part streams which are subjected, while flowing through the adapter 3 and before entering the slot die 4, to forces by means of which the LC polymer chains in the first part stream are oriented only in one preferred direction. The LC polymer chains of the second part stream, which is divided into a number of polymer strands by a rotating distributing element 21, which will be described in more detail below, have a plurality of different preferred directions compared with the polymer chains of the first part stream. In the apparatus in FIG. 1, a single extruder 1 is used and is connected via a melt line 2 directly to the adapter 3. The adapter 3 is upstream of the slot die. The further melt line 2′ branches from the melt line 2 upstream of the adapter 3 and is in the form of a bypass with respect to the adapter and is connected to the adapter 3 at a different point with respect to the melt line 2, this connection point being located on the opposite side of the adapter to the connection point of the melt line 2.

Due to the rotation of the distributing element 21, the polymer strands of the second melt stream form multiple-pitch helices and are superimposed on, or incorporated in, the first melt stream at various angles with respect to the direction of flow of the polymer matrix. The helices of the polymer strands may be superimposed one on top of the other as a multilayer structure.

Figure 2:
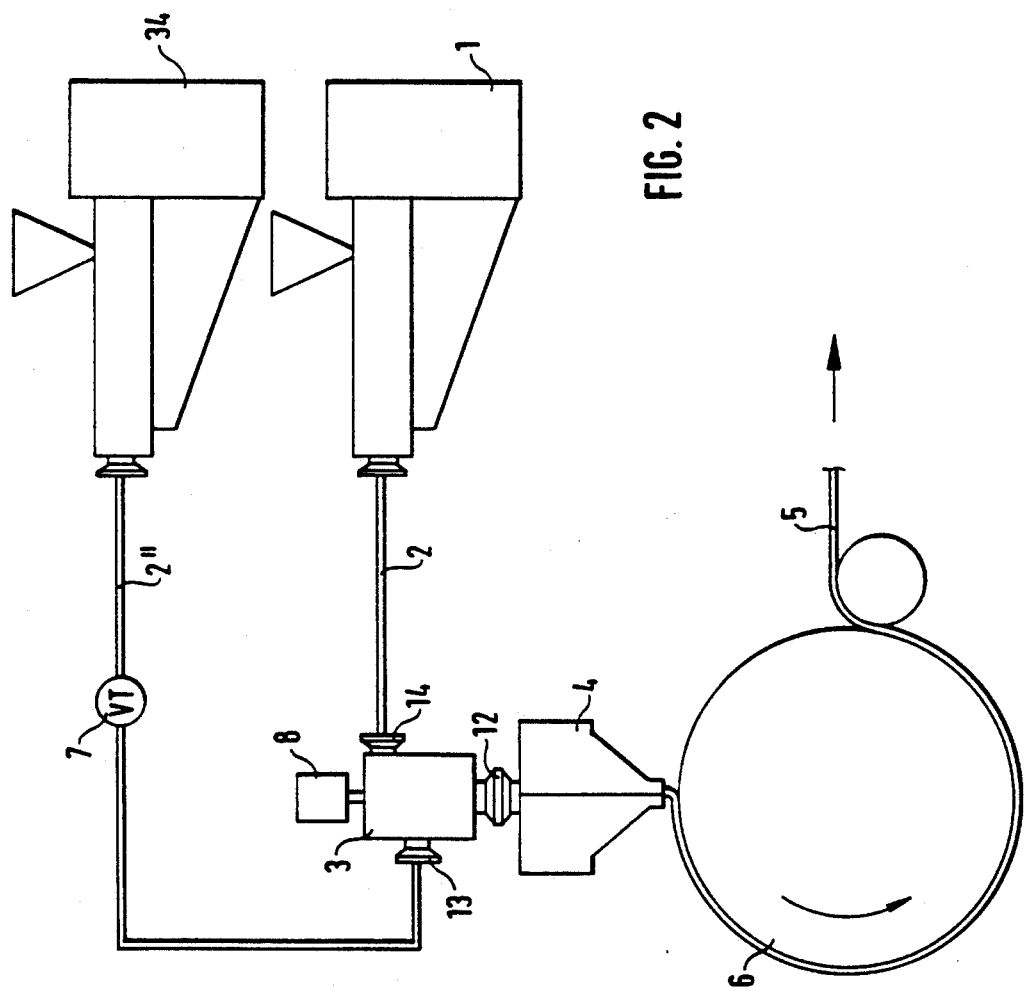
FIG. 2 shows an apparatus, similar to the apparatus in FIG. 1, having a further extruder.

The apparatus in FIG. 2 differs from the embodiment in FIG. 1 only in that a further extruder 34 is present, from which a melt line 2" leads to the adapter 3. This melt line 2" replaces the melt line 2' of the embodiment in FIG. 1. A flow control valve 7 which regulates the amount of the part stream delivered from the extruder 34 may be present in the melt line 2". The other components of the apparatus in FIG. 2 are substantially the same as the corresponding components of the embodiment in FIG. 1 and are therefore not described again. With this embodiment of the apparatus, it is possible in particular to use in the first and the second part stream chemically different thermotropic, liquid-crystalline polymers, since the polymer fed to the extruder 1 differs from that fed to the extruder 34. It is also possible to combine LC polymers with other polymers using this apparatus.

The polymer strands of the second part stream may have the same geometric shape or different geometric shapes and may have a circular, oval, square, rectangular or other cross-section. The multilayer melt stream is radially displaced or twisted in the form of a helix, or relative to its flow axis. The degree of radial displacement of the multilayer melt stream is determined via its flow rate and via the rotary speed of the distributing element 21 in the adapter 3.

While flowing through the adapter 3, strain and shear flows are imposed on the first and the second part streams to orient the chain molecules of the LC polymer or of the LC polymer and another polymer in preferred directions, the part streams being given identical or different orientations. The polymer strands of the second part stream are incorporated in predetermined cross-sectional planes of the first part stream, a thickness gradient being established. As will be described in more detail with reference to the drawings, the polymer strands of the second part stream are incorporated concurrently or non-concurrently in the polymer matrix of the first part stream. The polymer strands of the second part stream can be fed to the polymer matrix of the first part stream with a uniform or nonuniform rotary speed.

Figure 3:
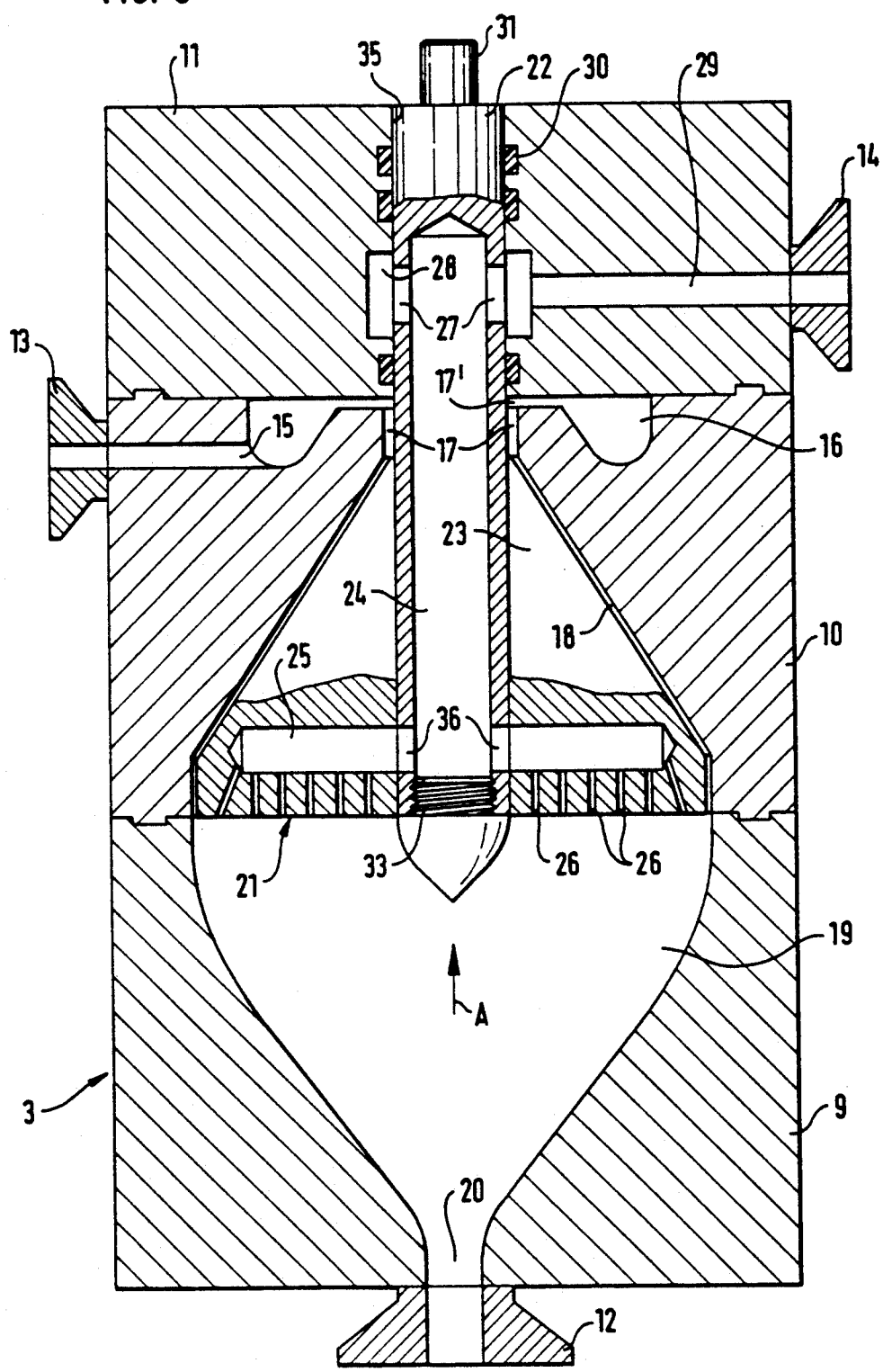
FIG. 3 shows a cross-section through the adapter according to the invention.

As shown in FIG. 3, the adapter 3 consists essentially of three plates connected to form a compact block by means of connecting elements which are not shown, such as screws (two outer end plates 9 and a central plate 10). While the connecting flange 12 of the end plate 9 connects the adapter 3 to the slot die 4, the flanges 13 and 14 permit connection of the adapter 3 to the extruder or 34 via the melt lines 2 and 2' or 2". An inlet channel 15 in the flange 13 serves for feeding a first part stream containing a polymer matrix into an annular distributing channel 16 which is connected via two die gaps 17, 17' to a distributing chamber 18 having a conical cross-section, the cross-section of which narrows to the dimension of the outlet channel 20 in the directly adjacent melting chamber 19 incorporated in the end plate 9.

An inlet channel 29 for one of the part streams is located in the upper end plate 11, while the opposite inlet channel 15 for the other part stream is arranged in the central plate 10.

The distributing element 21 which has contours corresponding to those of the distributing chamber 18 and which consists of a hollow shaft 22 and blades 23 arranged in a star-shape on its circumference rotates in said distributing chamber. The hollow shaft 22 is mounted in a hole 35 present in the end plate 11. The blades 23 (shown in FIG. 5a and 5b) have a profile determined by flow technology and possess a radial distributing channel which is connected to the central hole 24 of the hollow shaft 22 and from which a large number of die channels 26 or passages of any shape emanate and meet at the stagnation point of the plate profile. At the opposite end of the hollow shaft 22, a number of orifices 27 are located along its circumference, via which orifices, from an annular channel 28 connected to an inlet channel 29, the polymer melt forming the reinforcing structure enters the central hole 24 and finally the die channels 26. The torpedo-like threaded stopper 33 closes the central hole 24 toward the melt chamber 19.

The central hole 24 of the hollow shaft 22 is closed off from the melt chamber 19 by the threaded stopper 33 to form a stagnation space, which is connected to the radial distributing channel 25.

The hollow shaft 22 is rotatably mounted in the hole 35, which extends centrally through the upper end plate 11 and the central plate 10. The central hole 24 of the hollow shaft 22 is connected on the one hand via the orifices 27 in the wall of the hollow shaft 22 and an annular channel 28 in the upper end plate 11 to the inlet channel 29 and on the other hand by further orifices 36 in the hollow shaft wall to the radial distributing channel 25 in the central plate 10.

The distributing element 21 is caused to rotate by means of a drive unit 8 which can be coupled to a journal 31 of the hollow shaft 22, is speed-controlled and may be reversible in its direction of rotation. To prevent melt leakage along the rotating hollow shaft 22, seals 30 are inserted in the end plate 11.

Figure 4:
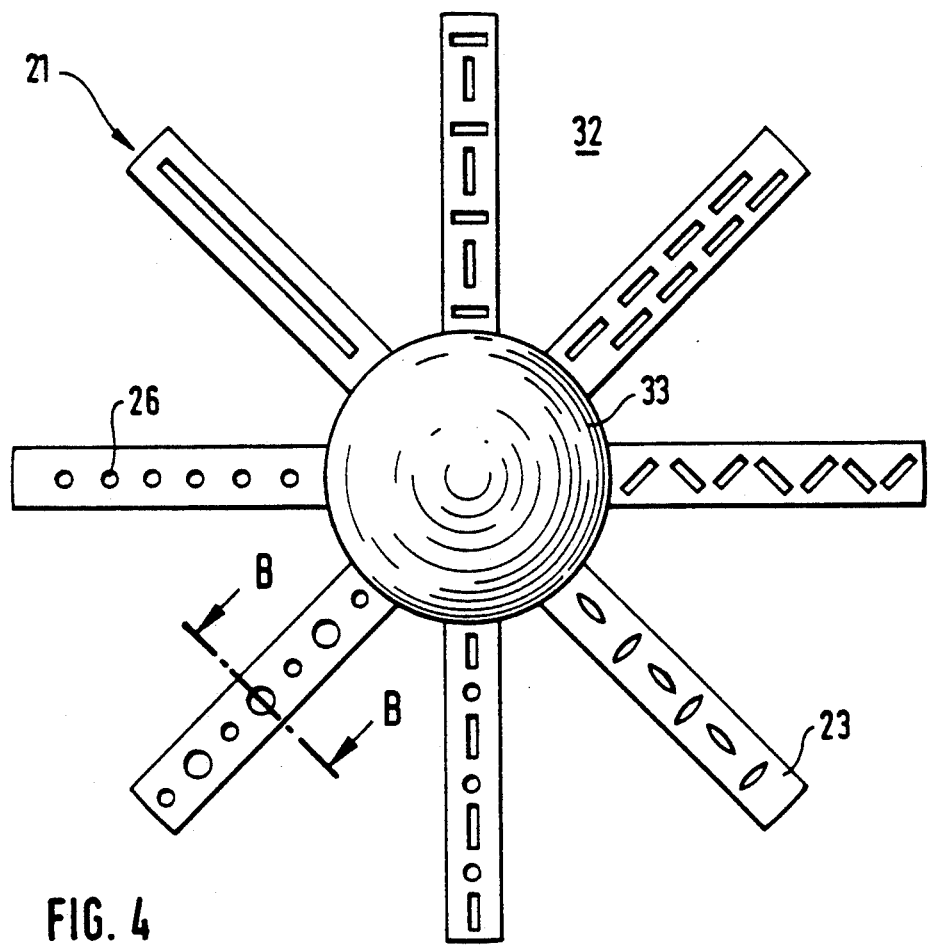
FIG. 4 shows a view of a distributing element in the direction of "A" in FIG. 3, which element is part of the adapter.

The embodiment of the distributing element 31 shown in FIG. 4 is equipped, for example, with eight blades 23. This embodiment can of course be varied for adaptation to the particular requirements, for example via the number and shape of the blades or size of the free flow cross-section between two blades 23. The same of course also applies to the embodiment of the die channels 26 which determine the shape of the polymer strands and are incorporated in the blades 23. In a preferred form, these may be, for example cylindrical holes of the same or of a different diameter, oval holes and slots of different lengths and widths, and/or any combination thereof whose geometric arrangement on the blades 23 may vary from blade to blade, as shown schematically in FIG. 4.

Through the dimensioning of the cross-section of the die channels 26, it is possible to influence the strain and shear flows of the polymer melt which determine the orientation of the chain molecules of the polymer melt and hence finally the strength of the finished film. Depending on the geometric arrangement of the die channels 26 in the blades 23, the adapter 3 permits setting of an orientation gradient over the thickness of the finished film or sheet. For example, if die channels 26 are present only on the outer and inner diameters of the blades 23, in the widest sense a multilayer film having alternate isotropically oriented and anisotropically oriented layers is obtained.

The blades 23 are arranged radially over the circumference of the hollow shaft 22 and parallel to the axis of the latter. It is also possible to arrange the blades 23 at a certain angle to the axis of the hollow shaft 22, on the circumference of the latter. The die channels 26 of all blades 23 may be present on the same arc or on an arc displaced from blade to blade.

Figures 5A, 5B:
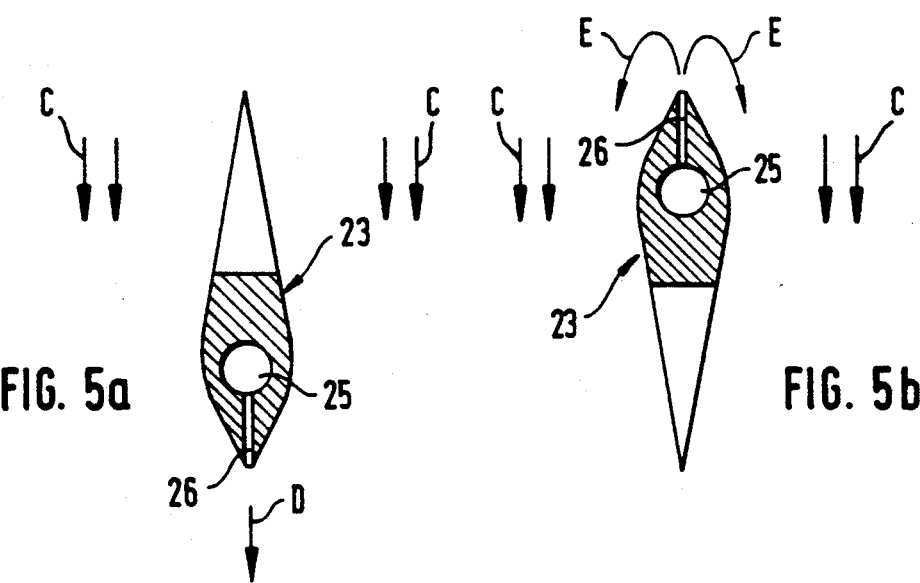
FIG. 5a and 5b show, in cross-section, two embodiments of blades of the distributing element along the line B—B in FIG. 4.

Other embodiments of the blades 23 are shown in FIGS. 5a and 5b, which illustrate sections along the line B—B in FIG. 4. In the embodiment in FIG. 5a, the part stream reinforcing the polymer matrix is injected concurrent with the polymer matrix flowing through the free flow cross-sections 32. The stagnation point of the blade 23 in FIG. 5a is in the region of the outlet orifice of the downward-pointing die channel 26. The direction of flow of the polymer matrix is indicated by the arrow C, while the arrow D shows the direction of flow of the polymer strands of the second part stream.

In the case of the embodiment in FIG. 5b, the stagnation point is at the top, i.e. in the region of the outlet orifice of the die channel 26. The part stream reinforcing the polymer matrix, which flows in the direction of the arrow C, is injected countercurrent to the polymer matrix flowing through the free flow cross-sections 32. As a result of this measure, the polymer strand emerging at the stagnation point of the blade 23 from the die channel 26 is divided into two part steams flowing around both sides of the blade, as indicated by the arrow E in FIG. 5b. This increases the reinforcing of the polymer matrix by the polymer strands and improves the isotropic properties of the film or of the thin sheet.

As shown in FIGS. 5a and 5b, on the blades 23 regions in which die channels 26 are present alternate with regions in which there are no die channels. The regions in which die channels 26 are present are shaded in FIGS. 5a and 5b, while the regions without die channels are not shaded.

In addition to the above-mentioned parameters, the rotary speed of the distributing element 21 also plays a decisive role with regard to the reorientation of the melt stream. In fact, primarily the pitch of the reinforcing helices and hence its direction with respect to the preferred direction of the polymer matrix in the melt film 5 emerging from the slot die 4 can be controlled as a function of the flow rate of the polymer matrix.

Surprisingly, the orientation of the chain molecules achieved in the adapter 3 does not undergo any change during subsequent shaping of the multilayer polymer melt in the slot die. Changes in the longitudinal direction occur exclusively in the outer polymer layers, on which high shear stresses act as a result of adhesion to the wall.

According to the invention, a method is also provided in which the polymer melt stream is divided into two part streams which are subjected, while flowing through an adapter before entering a die, to forces in such a way that the LC polymer chains of the first part stream are oriented only in one preferred direction and the LC polymer chains of the second part stream are oriented in at least one other, different preferred direction relative to those of the first part stream, and the two part streams are combined before entering the die.

In one embodiment of the process, the first part stream of the polymer melt stream, as the polymer matrix, forms the base of the molding, the preferred direction of the first part stream is the direction of flow and the second part stream is divided into individual polymer strands, which, as multiple-pitch helices, are superimposed on, or incorporated in, the polymer matrix of the first part stream. The multiple-pitch helices of the polymer strands superimposed on, or incorporated in, the first part stream at different angles with respect to the direction of flow, and the first part stream is reinforced by the helices when the two part streams are combined to form a common multilayer melt stream. The helices of the polymer strands are superimposed one on top of the other to form a multilayer structure.

Moldings, such as films, sheets, shaped and flat articles and profiles of thermotropic, liquid-crystalline plastics having a defined orientation of the chains of the LC polymer molecules in at least two preferred directions independently of one another are produced by the process of the present invention.

The concept of the invention essentially comprises achieving controlled uniaxial, biaxial or multiaxial orientation of the chain molecules of thermotropic, liquid-crystalline polymer melts in an adapter in order to improve the performance characteristics of films or sheets. The process operates in a simple manner substantially related to coextrusion. It is thus possible not only to produce products from a single liquid-crystalline polymer but also to combine different LC polymers with one another and with other polymers.

Compared with other processes which require the use of technically complicated special dies, the simply designed adapter can be coupled to any slot die. Easy changing of the rotating distributing element permits, where required, problem-free adjustment of the adapter to the particular processing conditions or the achievement of the desired properties of the films and moldings to be processed.

What is claimed is:

1. A process for the production of moldings from thermotropic, liquid-crystalline plastics in the form of a polymer melt stream, the chains of LC polymer molecules in said stream having defined orientations in at least two preferred directions, said process comprising the steps of:

dividing said polymer melt stream into at least first and second parts;

flowing said first and second parts through the same adapter;

subjecting said first and second parts to forces such that the LC polymer chains of said first part are oriented in a first preferred direction and the LC polymer chains of said second part are oriented in at least a second preferred direction different from said first preferred direction; wherein said first part comprises a polymer matrix which forms the base of the molding, and said subjecting step is carried out such that the preferred direction of said first part is the direction of flow and said second part is divided into individual polymer strands comprising multiple-pitch helices, combining said first and second parts to form a multilayer melt stream; and, flowing said multi-layer melt stream through a die to form the molding.

2. The process as claimed in claim 1, wherein said combining step includes superimposing said multiple-pitch helices of said second part stream on said first part stream.

3. The process as claimed in claim 2, wherein said multiple-pitch helices are superimposed at different angles with respect to the direction of flow, and said first part stream is reinforced by said helices when said first and said second part streams are combined to form said multilayer melt stream.

4. The process as claimed in claim 2, where said helices of said second part stream are superimposed one on top of the other to form a multilayer structure.

5. The process as claimed in claim 1, wherein during said subjecting step strain and shear forces are applied to said first and second part streams for orienting the chain molecules of the LC polymer in said preferred directions, said first part stream forming a polymer matrix and said second part stream reinforcing said polymer matrix during flow through said adapter.

6. The process as claimed claim 1, wherein said second part stream is radially displaced or twisted in the form of a helix with respect to its flow axis during said subjecting step.

7. The process as claimed in claim 6, wherein the degree of radial displacement of said second part stream is determined by means of its flow rate and the rotary speed of a distributing element in said adapter.

8. The process as claimed in claim 1, wherein said polymer strands of said second part stream are incorporated in predetermined cross-sectional planes of said first part stream such that an orientation gradient in the thickness direction is established.

9. The process as claimed in claim 1, wherein said first and second part streams comprise chemically different thermotropic, liquid-crystalline polymers.

10. The process as claimed in claim 1, wherein one of said first and second parts comprises an LC polymer and the other comprises a polymer other than a LC polymer.

11. The process as claimed in claim 1, wherein said polymer strands of said second part stream have the same geometric shape.

12. The process as claimed in claim 1, wherein said polymer strands of said second part stream have different geometric shapes.

13. The process as claimed in claim 12, wherein said geometric shapes are selected from the group consisting of circles, ovals, squares, and rectangles.

14. The process as claimed in claim 1, wherein said polymer strands of said second part stream are incorporated in flow or counterflow in said polymer matrix of said first part stream.

15. The process as claimed in claim 1, wherein said polymer strands of said second part stream are fed to said polymer matrix of said first part stream with a uniform or non-uniform rotary speed, respectively.

16. The process as claimed in claim 1, wherein said polymer melt stream comprises a wholly or partly aromatic polycondensate.

17. The process as claimed in claim 16, wherein said polycondensate is selected from the group consisting of polyesters, polyesteramides, polyetheresters, polyestercarbonates, and polyesteramidoimides.

18. The process as claimed in claim 1, wherein the produced molding is a film or sheet.

19. The process as claimed in claim 1, wherein said subjecting step takes place in said adapter.

20. The process as claimed in claim 1, wherein said polymer melt stream is provided by one or more extruders.

21. The process as claimed in claim 1, wherein during said subjecting step, at least one of the orientation stseps comprises biaxially orientation.

22. The process as claimed in claim 1, wherein during said subjecting step, at least one of the orientation steps comprises monoaxial orientation.

23. The process as claimed in claim 1, wherein during said subjecting step, at least one of the orientation steps comprises multiaxial orientation.

24. The process as claimed in claim 1, wherein the formed molding has isotropic or substantially isotropic mechanical and physical properties.

25. The process as claimed in claim 20, wherein said first part stream is provided by an extruder and said second part stream is provided by a different extruder.

26. The process as claimed in claim 20, wherein said first part stream is provided by an extruder and said second part stream is provided by the same extruder.

27. The process as claimed in claim 1, wherein the first and second part streams enter said adapter at different points.

28. The process as claimed in claim 25, wherein said first and second part streams comprise different polymers, with the proviso that at least one is a liquid crystalline polymer.

29. The process as claimed in claim 1, wherein said first and second part streams comprise the same type of liquid crystalline polymer.

* * * * *